(12) United States Patent
Mazumder et al.

(10) Patent No.: US 7,139,633 B2
(45) Date of Patent: Nov. 21, 2006

(54) METHOD OF FABRICATING COMPOSITE TOOLING USING CLOSED-LOOP DIRECT-METAL DEPOSITION

(76) Inventors: Jyoti Mazumder, 5074 Birkdale Dr., Ann Arbor, MI (US) 48103; Frank A. DiPietro, 6200 Wood Pond Rd., West Bloomfield, MI (US) 48323-2263

( * ) Notice: Subject to any disclaimer, the term of this patent is extended or adjusted under 35 U.S.C. 154(b) by 73 days.

(21) Appl. No.: 10/652,260

(22) Filed: Aug. 29, 2003

(65) Prior Publication Data
US 2005/0038551 A1   Feb. 17, 2005

Related U.S. Application Data

(60) Provisional application No. 60/407,016, filed on Aug. 29, 2002.

(51) Int. Cl.
*G06F 19/00* (2006.01)
(52) U.S. Cl. .............. 700/123; 700/119; 700/166; 219/121.65; 427/554
(58) Field of Classification Search ................ 700/119, 700/123, 166; 118/624; 219/121.65; 427/554
See application file for complete search history.

(56) References Cited

U.S. PATENT DOCUMENTS

| | | | |
|---|---|---|---|
| 4,044,774 A | 8/1977 | Corbin et al. ............... 607/117 |
| 4,323,756 A | 4/1982 | Brown et al. ......... 219/121 LF |
| 4,411,258 A | 10/1983 | Pujals, Jr. ................... 601/134 |
| 4,626,999 A | 12/1986 | Bannister .................... 700/166 |
| 4,633,889 A | 1/1987 | Talalla et al. ............... 607/117 |
| 4,663,513 A | 5/1987 | Webber ................... 219/121.6 |
| 4,724,299 A | 2/1988 | Hemmeke ............... 219/121 L |
| 4,803,986 A | 2/1989 | Dufresne et al. ........... 607/115 |
| 4,915,757 A | 4/1990 | Rando ......................... 156/64 |
| 5,031,618 A | 7/1991 | Mullett ......................... 607/46 |
| 5,041,974 A | 8/1991 | Walker et al. ................ 607/63 |
| 5,196,015 A | 3/1993 | Neubardt ...................... 606/61 |
| 5,246,745 A | 9/1993 | Baum et al. ................. 427/140 |
| 5,303,141 A | 4/1994 | Batchelder et al. ........... 700/29 |
| 5,342,409 A | 8/1994 | Mullett ......................... 607/46 |
| 5,358,513 A | 10/1994 | Powell, III et al. ........... 607/48 |
| 5,423,877 A | 6/1995 | Mackey ...................... 607/117 |
| 5,474,558 A | 12/1995 | Neubardt ...................... 606/79 |
| 5,501,703 A | 3/1996 | Holscheimer et al. ........ 607/46 |
| 5,517,420 A | 5/1996 | Kinsman et al. ............ 700/166 |
| 5,541,721 A | 7/1996 | Scheuer et al. .............. 399/178 |
| 5,595,670 A | 1/1997 | Mombo-Caristan .... 219/121.14 |
| 5,612,887 A | 3/1997 | Laube et al. ................. 700/119 |
| 5,642,287 A | 6/1997 | Sotiropoulos et al. ...... 700/166 |
| 5,643,330 A | 7/1997 | Holscheimer et al. ........ 607/46 |
| 5,659,479 A | 8/1997 | Duley et al. ............. 219/121.6 |
| 5,714,735 A | 2/1998 | Offer .......................... 219/136 |
| 5,729,277 A | 3/1998 | Morrison .................... 347/234 |
| 5,773,097 A | 6/1998 | Rogari ........................ 118/630 |

(Continued)

*Primary Examiner*—Leo Picard
*Assistant Examiner*—Sheela S. Rao
(74) *Attorney, Agent, or Firm*—Gifford, Krass, Groh, Sprinkle, Anderson & Citkowski, PC

(57) ABSTRACT

Manufacturing tools having a base and a working surface, such as trim steels, flange steels and die inserts, are formed by fabricating or casting a substrate out of a relatively ductile, low wear-resistant metal and forming the working surfaces such as cutting edges, flanging surfaces, die surfaces and die inserts by depositing layers of relatively hard, wear-resistant materials to the substrate by closed-loop direct-metal deposition or laser cladding. A multi-axis numerically controlled robot may be used to position and move a beam and deposition material over large substrates in forming such tooling.

3 Claims, 2 Drawing Sheets

U.S. PATENT DOCUMENTS

| | | | |
|---|---|---|---|
| 5,786,023 A | 7/1998 | Maxwell et al. | 427/8 |
| 5,837,960 A | 11/1998 | Lewis et al. | 219/121.63 |
| 6,046,426 A | 4/2000 | Jeantette et al. | 219/121.63 |
| 6,122,564 A | 9/2000 | Koch et al. | 700/123 |
| 6,311,099 B1 | 10/2001 | Jasper et al. | 700/166 |
| 6,396,025 B1 | 5/2002 | Pyritz et al. | 219/121.47 |
| 6,423,926 B1 | 7/2002 | Kelly | 219/121.63 |
| 6,459,951 B1 | 10/2002 | Griffith et al. | 700/166 |
| 6,518,541 B1 | 2/2003 | Kelly | 219/121.62 |

METHOD OF FABRICATING COMPOSITE TOOLING USING CLOSED-LOOP DIRECT-METAL DEPOSITION

RELATED APPLICATION

This application claims priority of U.S. Provisional Patent Application Ser. No. 60/407,016 filed Aug. 29, 2002, which is incorporated herein by reference.

FIELD OF THE INVENTION

This invention relates to a method of fabricating manufacturing tooling such as stamping dies, trim steels, die inserts and the like which involves forming a base of a first metal having relatively high ductility and low cost and forming the work-engaging areas on the space by depositing sections of a second metal using closed-loop direct-metal deposition.

BACKGROUND OF THE INVENTION

Currently, a variety of forms of manufacturing tooling such as stamping dies, trim steels, flange steels and die inserts are formed from homogeneous, high cost, alloy tool steels, either from wrought or cast materials. The materials used are often determined by the properties of the working or cutting edges or die surfaces while the larger volume of the tooling merely supports these working surfaces and does not require the same physical properties as these working parts. When the working surfaces have worn to the point that the tooling needs to be replaced, the entire homogeneous structure is discarded. Similarly, stamping and injection molding and die casting dies often require modest changes during the design process as a result of last-minute engineering functional or aesthetic changes in the product. Presently this often requires the creation of an entirely new tool.

During the past few years methods and apparatus have been developed for creating net shape functional parts with close tolerances and acceptable residual stress levels involving the deposition of multiple thin layers of feedstock, one upon the other, using an energy beam to fuse each layer onto a substrate. A typical system is disclosed in U.S. Pat. No. 6,122,564. This patent discloses a laser-aided, computer-controlled direct metal deposition system (DMD™) wherein successive layers of material are applied to a substrate so as to fabricate an object or provide a cladding layer. This system is equipped with feedback monitoring to control the dimensions and overall geometry of the fabricated section in accordance with a computer-aided design description. The deposition tool path is generated by a computer-aided manufacturing system. Such feedback controlled systems may totally eliminate intermediate machinery and reduce final machinery considerably.

Such DMD systems are capable of depositing sections on metallic substrates of a differing material than used in the deposition, on the condition that suitable choices of material are made and suitable surface treatment is performed to achieve a good metallurgical bond between the deposited material and the underlying substrate.

SUMMARY OF THE INVENTION

The present invention utilizes closed-loop direct metal deposition to deposit a working surface having the necessary properties of hardness and wear resistance, on a tooling base formed of a relatively low cost wrought or cast material.

The deposited material is preferably an alloy chosen to maximize the performance service life of the tooling. This can be achieved by combining ductile face centered cubic materials with relatively brittle non-cubic faces to achieve adequate toughness during service and reasonable wear resistance.

The selection of metals for use in the alloy is important for promoting certain phases as well as protection against chemical degradation. For example, molybdenum has very little solubility in aluminum. Forming the deposited section with metallurgically bonded molybdenum alloys in the formation of a casting die for use with aluminum will improve the service life by maintaining the surface integrity. The deposition process parameters control the pool cooling rate which controls the phase transformation kinetics. Therefore, the deposition process parameters may be varied to promote the generation of desired phases. The high cooling rate and strong convection associated with laser melting and solidification promotes atom trapping leading to extension of the solid solutions and these non-equilibrium syntheses may be utilized to dissolve low solubility materials such as yttrium and hafnium, in order to optimize the composite metallurgy.

The large and heavy tooling components create problems in the use of DMD processes since their high mass may make accurate translation difficult, and if the deposition must be formed on a curved surface difficulty is achieved in positioning the part relative to the laser feed. The present invention further contemplates supporting the material deposition components comprising the laser and the material feed on the wrist of a multi-axis robot which allows the beam and material to be delivered in almost any position of a large tooling base.

Other objects, advantages and applications of the present invention will be made apparent by the following detailed description. The detailed description makes reference to the accompanying drawings in which:

DETAILED DESCRIPTION OF THE INVENTION

Figure 2:
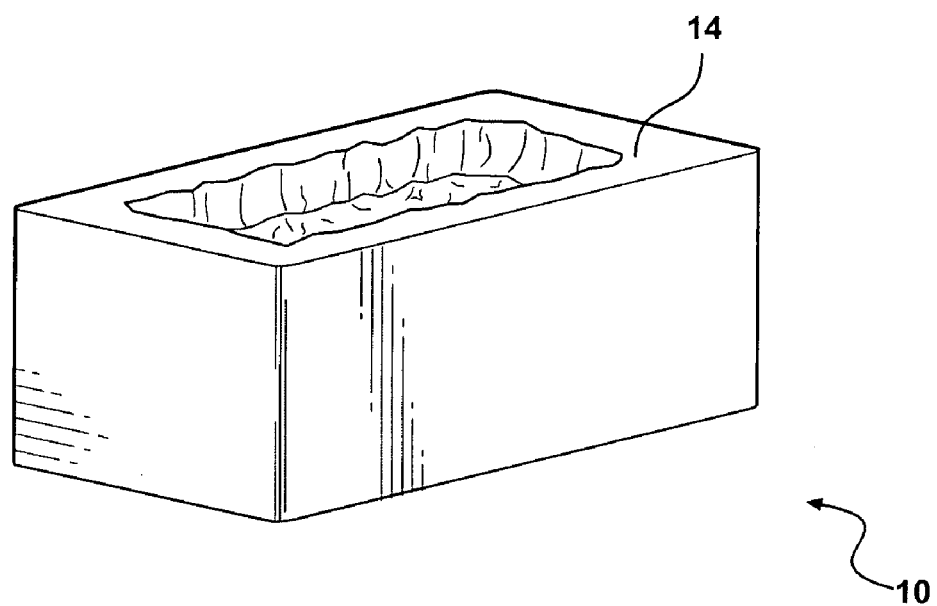
FIG. 2 is a perspective view of a completed die formed on the base of FIG. 1 and having a work contacting area formed of a second metal bonded to the first metal and formed by closed-loop direct metal deposition processes.

FIG. 2 represents a female stamping die generally indicated at 10 which may be formed by the method of the present invention. It should be understood that the method is applicable to formation of a wide variety of tooling in addition to stamping dies such as trim steels, flange steels, die inserts and the like.

Figure 1:
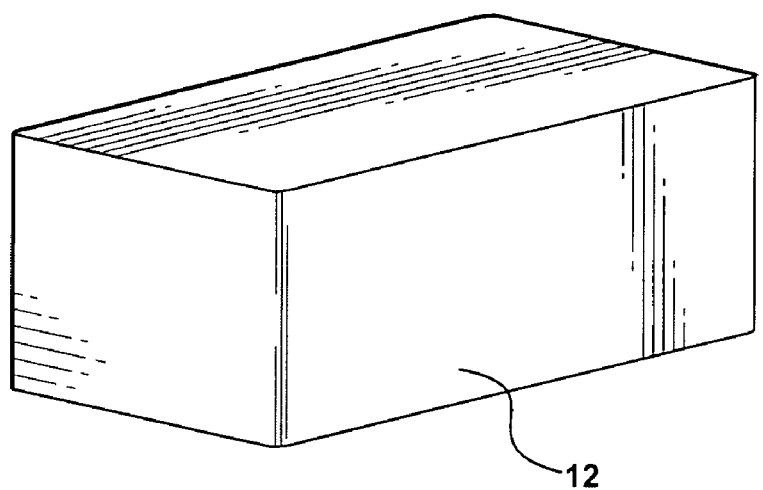
FIG. 1 is a perspective view of a base for a stamping die.

The completed die 10 is formed beginning with the base 12 as illustrated in FIG. 1. The base, adapted to be supported within a stamping press, does not include the work engaging surfaces of the die and accordingly it is not subject to the same wear as the working surfaces when in use. It can generally be formed of a less wear-resistant, more ductile material and lower cost than the work-engaging surfaces of the die. For example, it might be formed as a casting from a relatively low strength steel.

Work-engaging surfaces 14 of the die 10 are formed on the upper surface of the base 12 of an alloy which is harder and more wear-resistant than the metal of the base 12. In accordance with the method of the present invention, these metal engaging surfaces are formed by a process of closed-loop direct metal deposition. Such processes are disclosed in detail in a variety of issued patents such as U.S. Pat. No. 6,122,564 which discloses feedback means for sensing the height of a deposited weld-pool and modifying the process to maintain a constant height; U.S. Pat. No. 6,459,951 which employs a two-color imaging pyrometer to analyze and control the deposition; and U.S. Pat. No. 6,518,541 which measures the duty cycle of the laser during the deposition cycle and controls the process parameters to maintain the duty cycle within a desired range.

Figure 3:
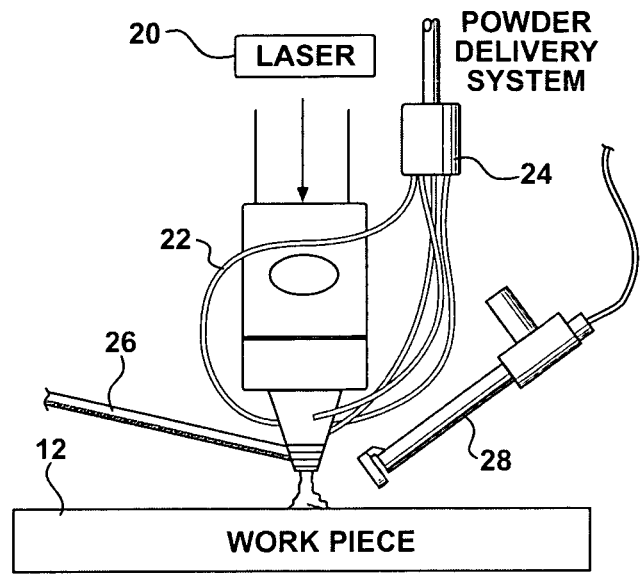
FIG. 3 is a schematic view of the deposition head of apparatus for forming the die of FIG. 2 on the base of FIG. 1, the schematic drawing including a feedback sensor.

FIG. 3 illustrates a direct deposition head operating upon a workpiece. A laser 20, preferably a power laser such as a $CO_2$ laser, provides a beam to a nozzle 22 which also receives a stream of powdered metal to be deposited from a delivery system 24. Chilled water is applied to the nozzle by a tube 26. A feedback control device 28 is supported adjacent to the mouth of the nozzle 22 at the workpiece 12 and senses the progress of the deposition process and generates a signal which is used to control the system parameters.

Figure 4:
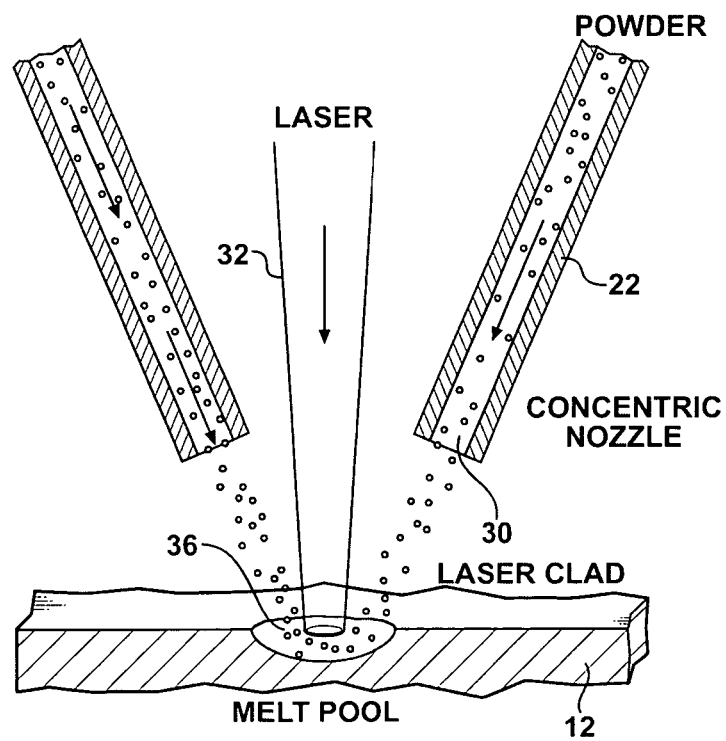
FIG. 4 is a schematic view of the laser spray nozzle of FIG. 3 forming a melt-pool on the base of FIG. 1 in the process of forming the die of FIG. 2.

This process is schematically illustrated in FIG. 4. A concentric passage 30 forming part of the nozzle 22 projects the powder, typically carried by a gas, toward the focal point of the laser beam 32 on the substrate 12. The heat generated by the laser melts the metal powder and heats the substrate so as to form a melt pool 36. A numerical control system (not shown) moves the substrate 12 relative to the deposition head in a programmed manner to form first one layer and then a series of superimposed layers on the substrate 12.

In conventional direct metal deposition systems the dimensions of the parts being formed and the angles of the surfaces on which the layers are deposited are such that a simple three axis numerical control system can be used to move the workpiece relative to the deposition head. However, many of the tooling parts formed by the present invention will require special manipulation, and the present invention proposes that either the workpiece or the deposition head be supported in a robotic manipulator. Preferably, the deposition delivery head is supported on the wrist of the robot and the tooling part is stationary. Such a system increases the flexibility of closed loop direct metal deposition even further to process stationary three-dimensional objects and add features enveloping the object through angles approximating 270 degrees.

Surface oxidation during the process may be minimized by well-known inert shielding gas delivered either through the concentric nozzle or a separate shielding nozzle. Under special circumstances the process may be carried out in an inert atmosphere chamber.

With proper selection of the deposit alloy system, the work-engaging section of the tooling can be designed and deposited with tailored properties such as improved surface life. A preferred strategy for surface modification of the tailored surface is as follows: Copy section 1—selection of phases, 2—selection of elements, 3—selection of process parameters.

The preferred embodiment of the invention may be modified in a number of known respects such as through delivery of alloy wire or the use of an electron beam as a power source rather than a laser beam.

For reconfiguration of the surface profile to satisfy a completely new design, or to change an existing design, the required area of an existing tooling part can either be machined off to a desired shape and subsequently built over using closed-loop direct metal deposition directly from the new computer-aided design data or built over the existing surface, if the new design can accommodate it.

It will be appreciated that a portion or the entire working surface of an existing tool can be adapted to provide improved wear-resistance properties using the inventive process. Similarly, a portion or the entire working surface of an existing tool can be adapted to provide improved oxidation resistance properties. Thermal management of the tooling can be enhanced by incorporating conformal cooling channels using the process of the present invention. Such thermal management of the dies and molds can be enhanced by incorporating conductive heat sinks or thermal barriers. The incorporation of heat sinks and conformal cooling using the present process can enhance thermal management of the dies and molds.

We claim:

1. A method of fabricating or improving an object, comprising the steps of:
    providing a substrate composed of aluminum, the substrate having a working surface forming a tool;
    depositing a layer of molybdenum or an alloy thereof on the working surface using a closed-loop direct-metal deposition (DMD) process of the type wherein powder is fed to a laser-induced melt pool to create a deposit having a dimension that is optically monitored; and
    wherein the layer of molybdenum or an alloy thereof has a very low solubility in the aluminum.

2. The method of claim 1, wherein the substrate forms part of a die cast die, stamping die, trim steel, flange steel or die insert.

3. The method of claim 1, wherein the working surface includes a cutting edge, flanging surface, die surface, or die insert.

* * * * *

UNITED STATES PATENT AND TRADEMARK OFFICE
CERTIFICATE OF CORRECTION

| | |
|---|---|
| PATENT NO. | : 7,139,633 B2 |
| APPLICATION NO. | : 10/652260 |
| DATED | : November 21, 2005 |
| INVENTOR(S) | : Jyoti Mazumder et al. |

It is certified that error appears in the above-identified patent and that said Letters Patent is hereby corrected as shown below:

Column 1, lines 15-16, replace "a base of a" with --a substrate of a--

Column 2, line 1, replace "base" with --substrate--

Column 2, line 35, replace "base" with --substrate--

Column 2, line 43, replace "base" with --substrate--

Column 2, line 45, replace "base" with --substrate--

Column 2, line 49, replace "base" with --substrate--

Column 2, line 50, after "sensor" insert --and--

Column 2, line 52, replace "base" with --substrate--

Column 2, line 53, after "Fig. 2" delete "and"

Column 2, line 64, replace "base" with --substrate--

Column 2, line 65, replace "base" with --substrate--

Column 3, line 6, before "work engaging" insert --in Fig. 2, 0--

Column 3, line 7, replace "base" with --substrate--

Column 3, line 8, replace "base" with --substrate--

Signed and Sealed this

Seventeenth Day of April, 2007

JON W. DUDAS
*Director of the United States Patent and Trademark Office*

UNITED STATES PATENT AND TRADEMARK OFFICE
CERTIFICATE OF CORRECTION

PATENT NO. : 7,139,633 B2
APPLICATION NO. : 10/652260
DATED : November 21, 2006
INVENTOR(S) : Jyoti Mazumder et al.

It is certified that error appears in the above-identified patent and that said Letters Patent is hereby corrected as shown below:

Column 1, lines 15-16, replace "a base of a" with --a substrate of a--

Column 2, line 1, replace "base" with --substrate--

Column 2, line 35, replace "base" with --substrate--

Column 2, line 43, replace "base" with --substrate--

Column 2, line 45, replace "base" with --substrate--

Column 2, line 49, replace "base" with --substrate--

Column 2, line 50, after "sensor" insert --and--

Column 2, line 52, replace "base" with --substrate--

Column 2, line 53, after "Fig. 2" delete "and"

Column 2, line 64, replace "base" with --substrate--

Column 2, line 65, replace "base" with --substrate--

Column 3, line 6, before "work engaging" insert --in Fig. 2, 0--

Column 3, line 7, replace "base" with --substrate--

UNITED STATES PATENT AND TRADEMARK OFFICE
CERTIFICATE OF CORRECTION

PATENT NO.         : 7,139,633 B2
APPLICATION NO. : 10/652260
DATED              : November 21, 2006
INVENTOR(S)        : Jyoti Mazumder et al.

It is certified that error appears in the above-identified patent and that said Letters Patent is hereby corrected as shown below:

Column 3, line 8, replace "base" with --substrate--

This certificate supersedes Certificate of Correction issued April 17, 2007.

Signed and Sealed this

Eighth Day of May, 2007

JON W. DUDAS
*Director of the United States Patent and Trademark Office*